United States Patent

[11] 3,609,130

| [72] | Inventors | John A. Manson<br>Bethlehem, Pa.;<br>George L. Moore, South Plainfield, N.J. |
|---|---|---|
| [21] | Appl. No. | 29,730 |
| [22] | Filed | Apr. 23, 1970 |
| [45] | Patented | Sept. 28, 1971 |
| [73] | Assignee | Air Products and Chemicals, Inc.<br>Allentown, Pa.<br>Continuation of application Ser. No.<br>671,145, Sept. 27, 1967, now abandoned. |

[54] POLYMER AND PROCESS OF MAKING SAME
7 Claims, No Drawings

[52] U.S. Cl. .................................................. 260/87.3
[51] Int. Cl. .................................................. C08f 1/13,
C08f 17/00, C08f 27/16

[50] Field of Search .......................................... 260/88.1,
83.5, 87.3

[56] References Cited
UNITED STATES PATENTS

| 2,386,347 | 10/1945 | Roland .......................... | 260/87.3 |
| 2,703,794 | 3/1955 | Roedel .......................... | 260/87.3 |
| 3,287,327 | 11/1966 | Zutty .............................. | 260/78.5 |

Primary Examiner—Joseph L. Schofer
Assistant Examiner—John Kight, III
Attorneys—Edmund H. Bopp and H. Hume Mathews ABSTRACT: A copolymer of vinyl acetate and bicycloheptadiene, which can be converted by hydrolysis to a vinyl alcohol copolymer, is produced by polymerizing vinyl acetate and bicycloheptadiene in the presence of a radical initiator.

POLYMER AND PROCESS OF MAKING SAME

This application is a continuation of application Ser. No. 671,145 filed Sept. 27, 1967 now abandoned. This invention relates to new and useful, plastic film-forming materials. More particularly this invention relates to novel branched and/or cross-linked copolymers of vinyl acetate and bicycloheptadiene and the vinyl alcohol analogs thereof. These copolymers are thermoplastic and can be extruded or pressure molded into sheets. The resultant shaped products are particularly valuable in view of their great resistance not only to water but also to a large variety of organic solvents.

Vinyl acetate is used in the preparation of a large number of vinyl polymers or plastics, including polyvinyl acetate. When polyvinyl acetate is partially hydrolyzed it yields what may be termed a copolymer of vinyl acetate and vinyl alcohol. This material reacted with butyraldehyde is widely used for sealing glass sheets into a layer of safety glass. Vinyl acetate has been copolymerized with a variety of monomers to yield plastic products that are of great industrial significance. In view of the ever increasing development and use of plastics there is a substantial incentive to develop new plastics.

It is, therefore, an object of this invention to provide a new and useful plastic material.

It is a further object of this invention to prepare new and useful plastics from vinyl acetate.

It is also the object of this invention to prepare branched and/or cross-linked copolymers of vinyl acetate and another comonomer.

These and other objects will appear more clearly from the detailed specification which follows.

It has now been found that excellent plastic materials can be obtained by copolymerizing vinyl acetate with bicyclo 2.2.1) hepta2,5-diene. The resultant copolymers can be hydrolyzed to the corresponding vinyl alcohol analogs. Both forms of the copolymers, containing about 2 to 47 percent bicycloheptadiene units perform surprisingly well even in the absence of any plasticizing agent when compression molded at 320° F. and 500 p.s.i.g. The copolymers are most probably highly branched and/or cross-linked based on their insolubilities in all solvents tried. The copolymers did not melt before reaching temperatures high enough to cause decomposition.

The vinyl acetate and bicycloheptadiene or norbornadiene can be copolymerized under solution or emulsion conditions. The vinyl acetate constitutes 54 to 99 percent of the monomer mixture and the diene 1 to 46 percent. Polymerization of the vinyl acetate-bicycloheptadiene mixture is effected in the presence of free radical initiators such as hydrogen peroxide, benzoyl peroxide, ammonium persulfate, potassium persulfate and aliphatic azo compounds such as a,a' - azo-bis-isobutyronitrile. The amount of free radical initiator used may vary from about 0.2 to 5 weight percent based upon the amount of monomers used.

The polymerization is effected at temperatures of from about 40° to 75° C., preferably at about 60° C. and for a sufficient period to effect about 24 to 87 percent conversion of the monomers. This period can vary widely but is ordinarily about 15–19 hours. The copolymers formed contain from about 2 to 47 percent of the diene. The yield of copolymer was high when the diene content of the monomer mixture was low (about 15 percent by weight or less) and became drastically lower as the diene content was increased above this level. The properties of the copolymers obtained indicate that little or no nortricycline units

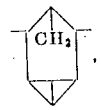

are present. Instead the copolymers obtained are, without doubt, highly branched and/or cross-linked. It is noted in this connection that all of the copolymers, including those containing only 2–5 percent of the bicycloheptadiene units were insoluble in all solvents tried, from common organic solvents to powerful solvents such as dimethyl sulfoxide. The copolymers formed gels which did not go into solution even after prolonged heating. In the second place, when heated to high temperatures the copolymers did not soften sufficiently to draw fibers, but darkened, followed by decomposition (evolution of smoke).

Upon completion of the polymerization, the reaction mixture is stripped of all volatile organic materials whereupon the vinyl acetate-bicycloheptadiene copolymers are dried. The copolymer may be subjected to hydrolysis or saponification to convert acetate groups to hydroxyl groups forming the vinyl alcohol-bicycloheptadiene analogs. Methoxide or methylate salts of sodium or potassium or the hydroxides of these alkali metals may be used as the alcoholating agents, preferably in the form of a methanol solution. It is preferred to hydrolyze the copolymers to such a degree that from about 80 to 100 percent of the acetate groups are converted to hydroxyl groups.

The following examples are illustrative of the present invention.

EXAMPLE I

The reactor was a round bottom flask equipped with stirrer, thermometer and water-cooled condenser. A nitrogen atmosphere was maintained by a Tee fitting on the top of the condenser.

Water (265 ml.) and the suspending agents, sodium dodecylsulfate (1.0 g.) and sodium dihydrogen phosphate monohydrate (1.0 g.), were placed in the reactor. Traces of air were removed by heating to reflux and sweeping with nitrogen. After cooling to room temperature, the vinyl acetate (95 g.), bicycloheptadiene (5.0 g.) and azo-bis-isobutyronitrile (0.5 g.) were added. By means of a water bath the mixture was warmed with good stirring to 55° C. and maintained at this temperature for 17 hours.

The reaction mixture was poured into a beaker containing about 1 liter of water and acetate-bicycloheptadiene until all volatile organic materials were evaporated (water temperature 95° C.). Then the copolymer was filtered and washed several times with water. After drying at least 1 day at 60° C. in a nitrogen atmosphere the vinyl acetate-bicycloheptadiene copolymer weighed 84.0 g. It has the following analysis:

| | | | |
|---|---|---|---|
| Calcd. PVAc | C 55.8 | H 6.97; | O 37.2 |
| Found | C 57.3 | H 7.1 | O 33.9 |

Based on the carbon content the copolymer contained 4.6 percent bicycloheptadiene units. Glass transition temperature (Tg) was 48° C.

Samples of this copolymer compression molded reasonably well at 320° F. for 1 min. at 500–850 p.s.i. to yield 1/32-inch sheets of light color.

EXAMPLE II

The procedure of example I was repeated except that the amount of vinyl acetate was reduced to 85.0 g. and the amount of bicycloheptadiene was increased to 15.0 g. The copolymer, freed of volatile organic material, filtered, washed and dried overnight at 80° C. was a light colored granular solid and the yield was 79.5 g. Upon analysis the product was found to contain C — 61.35 percent; H— 7.71 percent and O— 30.48 percent and based on carbon content the copolymer contains 15.6 percent bicycloheptadiene. Samples of this product compression molded at 320° F. for 1 min. at 500–850 p.s.i. to yield 1/32-inch sheets which were clearer and tougher than the sheets of EXAMPLE I. Tg = 66° C.

EXAMPLE III

The procedure of example I was repeated except that in run A 70.0 g. vinyl acetate and 30.0 g. of bicycloheptadiene and in run B 75.0 g. vinyl acetate and 25.0 g. of bicycloheptadiene were used. The filtered and washed product from run A was dried in a vacuum oven for about 5 hours at 50° C. and 25–30 mm. and from run B dried over a weekend at 80° C. The results obtained are summarized in table I.

TABLE I

|  | Run A | Run B |
| --- | --- | --- |
| Yield | 7.8 g. | 9.3 g. |
| Analysis |  |  |
| Carbon | 68.5% | 66.7% |
| Hydrogen | 7.92% | 7.54% |
| Oxygen | 22.85% | 24.98% |
| Bicycloheptadiene Content |  |  |
| Based on Carbon | 35.8% | 30.7% |
| Based on Oxygen | 38.5% | 32.8% |

These runs show the low yield obtained when the bicycloheptadiene content of the monomer mixture is increased to 30% and 25% respectively. Run A—Tg=79° C and Run B—TG=75°C.

EXAMPLE IV 265 cc. of distilled water were placed in the reactor and heated to boiling in a nitrogen atmosphere to remove air. The water was then cooled to room temperature whereupon 80.0 g. of vinyl acetate, 1.0 g. sodium dodecyl sulfate, 1.0 g. sodium hydrogen phosphate monohydrate, 20.0 g. bicycloheptadiene and 0.5 g. azo-bis(isobutyronitrile) were added. The reaction mixture was gradually heated to reaction temperature (55.5° C.) in about 1¼ hours and maintained at this temperature with good stirring for about 17 hours. The copolymer, freed of volatile organic material, filtered, washed several times with water was dried for 24 hours at 80° C. The yield of product was 29.5 g. Upon analysis the product was found to contain carbon—64.7 percent; hydrogen—6.66 Percent and oxygen—27.32 percent. The bicycloheptadiene content of the copolymer is 25.1 percent (based on carbon) and 26.5 percent (based on oxygen).

EXAMPLE V 265 cc. of deionized water, 1.0 g. sodium dodecyl sulfate and 1.0 g. sodium hydrogen phosphate monohydrate were placed in reactor and heated in a nitrogen atmosphere to remove air. The solution was cooled to room temperature whereupon 80.0 g. of vinyl acetate and 0.5 g. of azo-bis (isobutyronitrile) were added. 20.0 g. of bicycloheptadiene was placed in a dropping funnel attached to the reactor to be added dropwise into the reaction mixture over a period of several hours. The reaction mixture was slowly heated to 50° C. whereupon the dropwise addition of the bicycloheptadiene to the reaction mixture was started. In the next 23 minutes the temperature of the reaction mixture was raised to 55° C. and 1 cc. of the monomer was added. The reaction mixture was maintained at that temperature with good agitation and the remainder of the 20 g. of monomer was added dropwise at a rate of about 1 cc. every 15 minutes or over a period of about 5 hours. The reaction mixture was maintained at the reaction temperature with good agitation for 12 hours more whereupon the copolymer was recovered and treated as in example 1. The copolymer was dried for 24 hours in a nitrogen atmosphere at 60° C. and weighed 39.5 g. Analysis of the copolymer showed carbon—62.10 percent; hydrogen—6.88 percent; and oxygen—28.76 percent and the bicycloheptadine content is 17.8 percent (based on carbon) or 22.7 percent (based on oxygen). It would appear from this that slow addition of the bicycloheptadine minimizes its retarding effect upon the polymerization making the production of higher yields of copolymer possible.

EXAMPLE VI 500 cc. of distilled water, 1.0 g. sodium dodecyl sulfate and 1.0 g. sodium hydrogen phosphate monohydrate were placed in the reactor and heated to boiling in a nitrogen atmosphere to remove air whereupon the solution was cooled to room temperature and 0.25 g. of azo-bis(isobutyronitrile was added. A solution of 80.0 g. (86 cc.) of vinyl acetate, 20.0 g. (21 cc.) of bicycloheptadiene and 0.25 g. of azo-bis(isobutyronitrile) was made up and placed in a dropping funnel attached to the reactor 10 cc. of the monomer solution was added to the reactor and the contents were gradually heated to reaction temperature of about 55° C. with good stirring. The monomer solution was then added dropwise to the reactor at a rate of 1 cc. in from about 2½ to 3 minutes until all had been added (about 5 hr.). Heating and stirring of the reaction mixture were continued for an additional 16 hours whereupon the copolymer was recovered and treated as in example I. The copolymer was dried for 24 hours in a nitrogen atmosphere at 60° C. and weighed 24.0 g. Analysis of the copolymer showed carbon—65.45 percent; hydrogen—7.38 percent and oxygen—25.21 percent and the bicycloheptadiene content is 27.2 percent (based on carbon) and 32.2 percent (based on oxygen). While the addition of the monomers in this manner did not give higher yields of copolymer it did produce copolymers of the highest bicycloheptadiene content when using a 1:4 weight ratio of bicycloheptadiene to vinyl acetate. Tg = 72° C.

EXAMPLE VII 265 cc. of distilled water, 0.5 g. sodium dodecyl sulfate, 0.5 g. sodium hydrogen phosphate monohydrate were placed in the reactor and heated to the boiling point in a nitrogen atmosphere to remove air. The reactor was cooled, 46.0 g. of bicycloheptadiene was added and the reactor warmed to the reaction temperature of 54–55° C. 1.0 g. of azo-bis(isobutyronitrile) was dissolved in 54.0 g. of vinyl acetate and placed in a dropping funnel attached to the reactor. The solution was added dropwise to the reactor, about one-fourth of which was added in the first hour and the remainder in the next two hours. The reaction mixture was maintained at reaction temperature with good agitation for a total of about 12 hours.

The cooled reaction mixture which was milky with very little solid present was transferred to a continuous extractor and extracted with ether. A considerable amount of greasy solid formed in the extractor and carried over with the extracts. Ether was removed from the extracts up to a pot temperature of 65° C. and the still pot contents were saved.

The extracted aqueous mixture was transferred to a beaker along with the still pot contents and heated to boiling to drive off any materials boiling below 100° C. A solid mass formed which was broken and reduced to a fine state by suspending in water and placing it in a Waring blender, then transferred to a Buchner funnel and filtered. The solids were washed a number of times with water and then twice with hexane. The solids were then dried for 6 hours at 10–15 mm. to obtain a constant weight. The yield of copolymer was 27.4 g. which analyzed: carbon 72.6 percent; hydrogen 7.44 percent and oxygen 18.05 percent. The diene content of the product is 47 percent (based on carbon) or 51 percent (based on oxygen). Tg = 75° C.

EXAMPLE VIII

The process of example I was repeated except that the amount of vinyl acetate was increased to 99.0 g. and the amount of bicycloheptadiene was reduced to 1.0 g. The reaction mixture was maintained at 56°±1° C. with good stirring for 17 hours. The copolymer, freed of volatile organic material, filtered, washed and dried in an oven for about 8 hours at 60° C. and at 10–15 mm. weighed 87.2 g. Upon analysis the product was found to contain: carbon 56.5 percent; hydrogen—6.86 percent and oxygen 35.75 percent. Based on this analysis the copolymer contained 1.98 percent (based on carbon) or 3.9 percent (based on oxygen) of bicycloheptadiene units. This copolymer compression molded into more flexible sheets which, although tougher than the molded sheets made from the copolymer of example II, still would break after bending so far. The color was lighter than any of the previous samples and the sheet was transparent. Tg = 40° C.

This copolymer, although very low in bicycloheptadiene unit content was not found to be soluble in any of the following common organic solvents.

| Solvent | Result |
|---|---|
| Cyclohexanone | At 100° C. a clear gel formed; no polymer dissolved. |
| Dimethyl Sulfoxide | A difficult-to-see, clear gel formed in the hot DMSO; again little or no polymer dissolved. |
| Toluene | Clear gel formed; polymer insoluble. |
| Tetrahydrofuran | Clear gel formed; polymer insoluble. |
| Acetone | Gel formed rapidly at room temp.; polymer remained insoluble in boiling acetone. |
| Dioxane | Formed gel at room temp.; polymer remained insoluble even at the boiling point. |

Polyvinyl acetate, on the other hand, is insoluble in toluene and dioxane at room temperature but is soluble at 100° C. and partially soluble in tetrahydrofuran and acetone at room temperature but completely soluble in these solvents at about 55–65°< C.

EXAMPLE IX 15 g. of the copolymer produced in example I and 150 cc. of absolute methanol were placed in the reactor which had been dried by heating and sweeping with nitrogen. The reactor was heated to reflux temperature for 1 hour. The solid polymer did not dissolve although some gel appeared to form. The reactor was cooled. 3.0 g. of sodium methoxide was combined with 50 cc. of absolute methanol and stirred to dissolve as much of the former as possible whereupon this mixture was added to the reactor which was again heated to reflux temperature (63°–63.5° C) and maintained at that temperature for 8 hours. The refluxed mixture was then cooled, filtered and the filter cake washed several times with methanol. The filtered solids, after drying in a vacuum oven at 60° C. at 10–15 mm. for about 7 hours, weighed 8.1 g. Upon analysis the product was found to have a saponification number less than 0.05; carbon–55.97 percent; hydrogen—9.21 percent and oxygen—32.15 percent. Accordingly, the acetate copolymer was completely hydrolyzed to the vinyl alcohol analog and contained 4.7 percent (based on carbon) or 10.9 percent (based on oxygen) of bicycloheptadiene units.

EXAMPLE X

The procedure of example IX was repeated using 500 cc. of absolute methanol and 50 g. of the copolymer of example II and adding 10 g. of sodium methoxide with 85 cc. absolute alcohol after the first reflux operation to effect the desired saponification. The copolymer did not dissolve during the first reflux operation and no gel formed on cooling the refluxed mixture preparatory to adding the saponification agent. After reflux for 8 hours, the copolymer recovered and dried at 60° C. and 15–20 mm. for about 8 hours weighed 29.0 g. Upon analysis the vinyl alcohol analog product was found to have a saponification number of 20.2; carbon—61.40 percent; hydrogen—9.19 percent and oxygen—25.56 percent and contained 21.6 percent (based on carbon) or 26.8 percent (based on oxygen) of bicycloheptadiene units.

This vinyl alcohol copolymer was much like the original vinyl acetate copolymer of example II when compression molded. The molded sheets therefrom were of the same toughness and brittleness, but not as clear and traNsparent. Their color was a little lighter except for several grey spots in the sheet. Although this is a vinyl alcohol copolymer the molded sheets did not feel the least bit sticky or greasy when moistened. However, the surface acquired a hazy appearance when wetted.

The above data show that vinyl acetate can form copolymers with bicycloheptadiene which are insoluble in various organic solvents yet are tractable, i.e. they may be compression molded into strong, tough, transparent sheets. The vinyl alcohol derivatives are also less water sensitive than polyvinyl alcohol itself.

It will be understood, however, that this invention is not limited to these examples since numerous variations will be apparent to those skilled in this art without departing from the scope of the following claims.

We claim:

1. The process which comprises emulsion polymerizing vinyl acetate with bicycloheptadiene in the presence of a free radical initiator to form copolymers which are insoluble in common organic solvents, wherein the improvement comprises carrying out the polymerization batchwise but at least part of said bicycloheptadiene being added incrementally during the polymerization.

2. The process as defined in claim 1, wherein the vinyl acetate constitutes 54 to 99 percent of the monomer mixture and the diene 1 to 46 percent.

3. The process as defined in claim 2, in which the copolymer formed contained from 2 to 47 percent of diene units.

4. The process defined in claim 1, further comprising the step of reacting the copolymer thus formed with an alcoholating agent to convert the vinyl acetate copolymers to the corresponding vinyl alcohol analogs.

5. The vinyl alcohol analogs of the copolymers of vinyl acetate and bicycloheptadiene containing from about 2 to 47 percent of diene units, said copolymers being insoluble in common organic solvents and compression moldable into strong sheets and being produced by the process defined in claim 4.

6. The process of claim 1 wherein little or no nortricycline units are present in the copolymer product.

7. The analogs of claim 5 wherein little or no nortricycline units are present.